Figure 1:
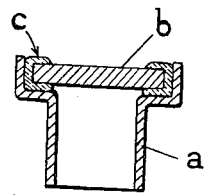

May 29, 1962 — R. BENICHOU — 3,036,675

HIGH-MELTING-POINT SEALS

Filed May 22, 1957

INVENTOR
ROBERT BENICHOU

BY Paul M. Craig Jr.

ATTORNEY

United States Patent Office 3,036,675
Patented May 29, 1962

3,036,675
HIGH-MELTING-POINT SEALS
Robert Benichou, Paris, France, assignor to Compagnie Generale de Telegraphie sans Fil, Paris, France
Filed May 22, 1957, Ser. No. 660,949
Claims priority, application France June 2, 1956
14 Claims. (Cl. 189—36.5)

The present invention relates to seals having a high point of fusion and obtained with the aid of an additional or filler material, between metallic pieces and insulating pieces, and has for its object a new seal of that type as well as the corresponding method or process permitting the realization of sealed structures which are vacuum-tight and which preserve their tightness even after baking at or heating to temperatures as high as about 800° C.

According to the present invention, the seal having a high melting point, realized with an additional or filler material, between a metallic piece and an insulating piece is characterized in that this additional filler material is a double silicate of alumina and of potash. This double silicate may be utilized in its naturally occurring form without prior purification.

The process of sealing according to the present invention consists in crushing or grinding into fine powder a double silicate of alumina and potash, in mixing that powder with a small quantity of water or of any suitable conventional binder in such a manner as to form a thick paste, in applying this paste between the pieces to be sealed in a layer of any desired thickness, and to heat the assembly up to the complete fusion or melting of the paste in an oven under controlled pressure and at a temperature of approximately 1250° C.

The silicate mentioned hereinabove is preferably the lepidolite or obsidian of which typical compositions are as follows, the percentages indicated being percentages by weight:

For the natural varieties of lepidolite: 49 to 52% silica, 26 to 33% alumina, 1 to 6% lithia (lithium oxide), 4 to 19% potash and 3 to 8% iron.

For the natural varieties of obsidian: 74% of silica, 12% of alumina, 5% of potash, 4% of soda, 2.8% of iron oxide, 0.4% of magnesia and 1.8% of water.

For the metallic pieces the present invention contemplates preferably the use of refractory metals such as tantalum or molybdenum or alloys such as iron-nickel-cobalt alloys, for example, Kovar.

The insulating pieces according to the present invention may be suitable ceramic materials of diverse compositions, or may be sapphires (crystallized $Al_2O_3$) or spinelles ($MgO$—$3.5Al_2O_3$), or still pieces of sintered alumina.

Accordingly, it is an object of the present invention to provide a seal and method for producing the seal between metallic and insulating pieces which is capable of withstanding relatively high temperatures.

It is another object of the present invention to provide a seal particularly suitable for use in vacuum tubes which assures vacuum-tightness even when subjected to relatively high temperatures, as may occur in the operation of the tube during heavy loads.

Still another object of the present invention resides in the particular method of making a seal between a conductive and an insulating part which method may be readily realized.

A further object of the present invention resides in the provision of a seal between metallic and insulating parts which utilizes additional or filler material to produce the seal, the particular material or materials used being readily available commercially.

These and other features, objects and advantages of the present invention will become more obvious from the following description when taken in connection with the accompanying drawing which shows, for purposes of illustration only, several embodiments in accordance with the present invention and wherein:

FIGURE 1 is a cross sectional view through a first embodiment of a seal in accordance with the present invention, and FIGURES 2 to 6 are cross sectional views similar to FIGURE 1, of modified embodiments of seal constructions in accordance with the present invention.

Figure 2:
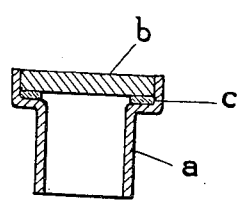

Referring now to the drawing wherein like reference characters are used throughout the various views to designate like parts, and more particularly to FIGURES 1 and 2, reference character *a* designates a piece made of refractory metal and reference character *b* a spinelle piece. The two pieces *a* and *b* are sealed with the aid of a layer of obsidian *c*, this layer having a relatively large thickness in the embodiment of FIGURE 1 where it is applied all around the edges of the spinelle *b*, and having a relatively thin thickness in the embodiment according to FIGURE 2 where it is applied only along the periphery and below the spinelle piece *b*.

Figure 3:
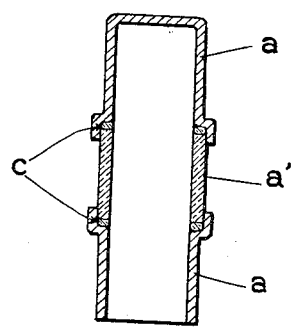
Figure 4:
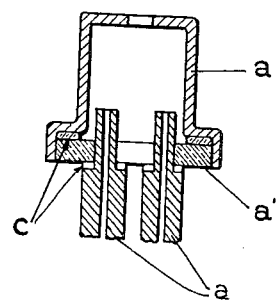

In FIGURES 3 and 4, the pieces designated by reference character *a* are again made of refractory material, such as, for example, tantalum while the pieces *a'* are made of ceramic material. Reference character *c* designates thin layers of sealing material, such as obsidian which assure the sealing according to the present invention.

Figure 5:
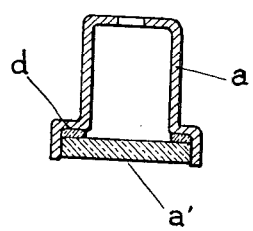
Figure 6:
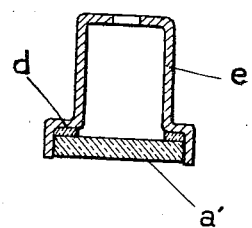

In FIGURES 5 and 6, the pieces *a* and *e*, respectively, consist, for example, in FIGURE 5 of refractory metal, and in FIGURE 6, for example, of an iron-nickel-cobalt alloy whereas the pieces *a'* are again made of suitable conventional ceramic material. The sealing is obtained by a thin layer *d* of lepidolite.

It is understood that in connection with all seals in accordance with the present invention, as in connection with those examples mentioned hereinabove, the pieces to be sealed are chosen among materials having essentially similar coefficients of expansion.

While I have shown and described several embodiments in accordance with the present invention, it is understood that the same is not limited thereto but is susceptible of many changes and modifications within the spirit of the present invention, and I intend to cover all such changes and modifications as encompassed by the appended claims. For example, the specific materials mentioned in connection with the respective embodiments may also be used with the other embodiments, or may be interchanged with one another.

I claim:

1. A vacuum-tight seal between a metallic part and an insulating part included in a wall of an evacuated vessel which maintains its tightness even upon subjection to elevated temperatures in the range of 800° C., comprising a filler material consisting essentially of a naturally occurring silicate mineral containing alumina and potash.

2. A seal according to claim 1, wherein said naturally occurring silicate mineral is lepidolite.

3. A seal according to claim 1, wherein said naturally occurring silicate mineral is obsidian.

4. A seal according to claim 1, wherein said metallic part is made of tantalum.

5. A seal according to claim 1, wherein said metallic part is made of molybdenum.

6. A seal according to claim 1, wherein said metallic part is made of an iron-nickel-cobalt alloy.

7. A seal according to claim 1, wherein said insulating part is made of ceramic.

8. A seal according to claim 1, wherein said insulating part is made of sintered alumina.

9. A seal according to claim 1, wherein said insulating part is made of sapphire.

10. A seal according to claim 1, wherein said insulating part is made of spinelle.

11. A process for providing a seal between a metallic part and an insulating part which maintains its tightness even upon subjection to elevated temperatures in the range of 800° C., comprising the steps of grinding a double silicate in native form of alumina and potash into fine powder, of mixing said powder to a binder to form a thick paste, of applying said paste between the pieces to be sealed in a layer of predetermined thickness, and of heating the assembly under controlled pressure to a temperature providing complete fusion of said paste.

12. A process according to claim 11, wherein said temperature during heating is about 1250° C.

13. A process for producing a seal according to claim 11, wherein said silicate is lepidolite.

14. A process of producing a seal according to claim 11, wherein said silicate is obsidian.

References Cited in the file of this patent

UNITED STATES PATENTS

| | | |
|---|---|---|
| 1,443,813 | D'Adrian | Jan. 30, 1923 |
| 1,734,698 | Trenzen | Nov. 5, 1929 |
| 2,248,415 | Schwartzwalder et al. | July 8, 1941 |
| 2,290,107 | Luks | July 14, 1942 |
| 2,436,005 | Hopps et al. | Feb. 17, 1948 |
| 2,469,211 | Schwartzwalder et al. | May 3, 1949 |
| 2,562,163 | Hiensch et al. | July 31, 1951 |
| 2,670,572 | Smith | Mar. 2, 1954 |
| 2,708,787 | Chick et al. | May 24, 1955 |
| 2,743,553 | Armistead | May 1, 1956 |
| 2,771,969 | Brownlow | Nov. 27, 1956 |
| 2,774,681 | Huppert et al. | Dec. 18, 1956 |
| 2,888,406 | Bondley et al. | May 26, 1959 |